C. C. STUTZ.
MANUFACTURE OF GLASS ARTICLES.
APPLICATION FILED MAR. 8, 1912.
1,037,365.
Patented Sept. 3, 1912.
3 SHEETS—SHEET 2.
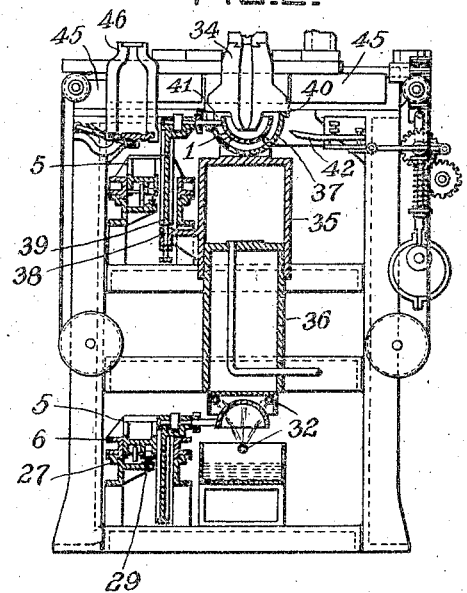
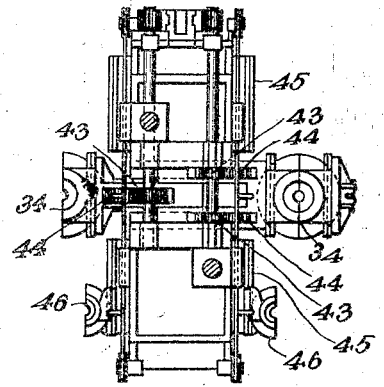
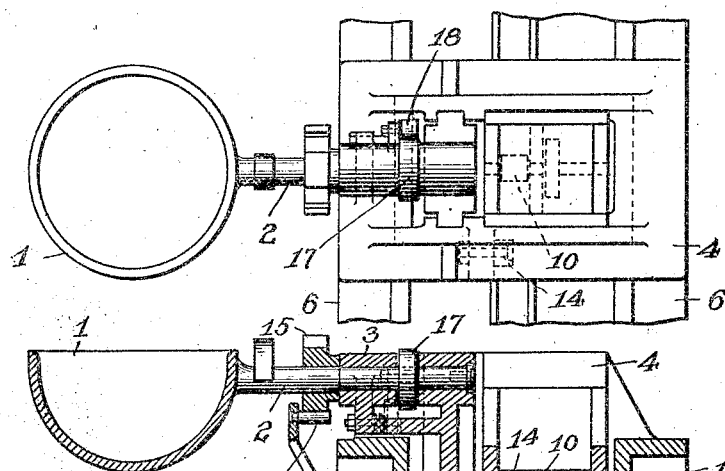
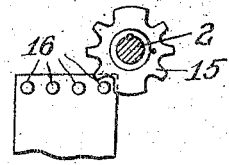
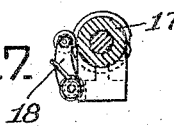
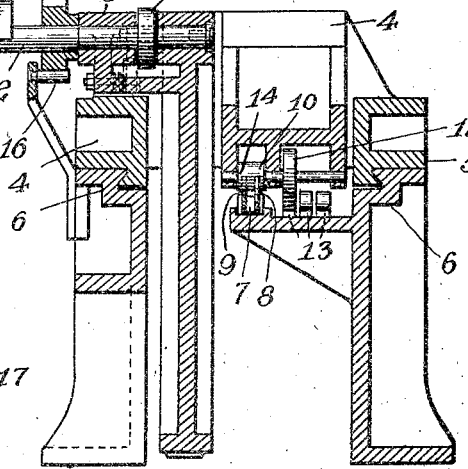
WITNESSES:
J. Herbert Bradley.
Thomas D. Joyce.
INVENTOR
Charles C. Stutz
by Dennis S. Wolcott
Atty C. C. STUTZ.
MANUFACTURE OF GLASS ARTICLES.
APPLICATION FILED MAR. 8, 1912.
1,037,365.
Patented Sept. 3, 1912.
3 SHEETS—SHEET 3.
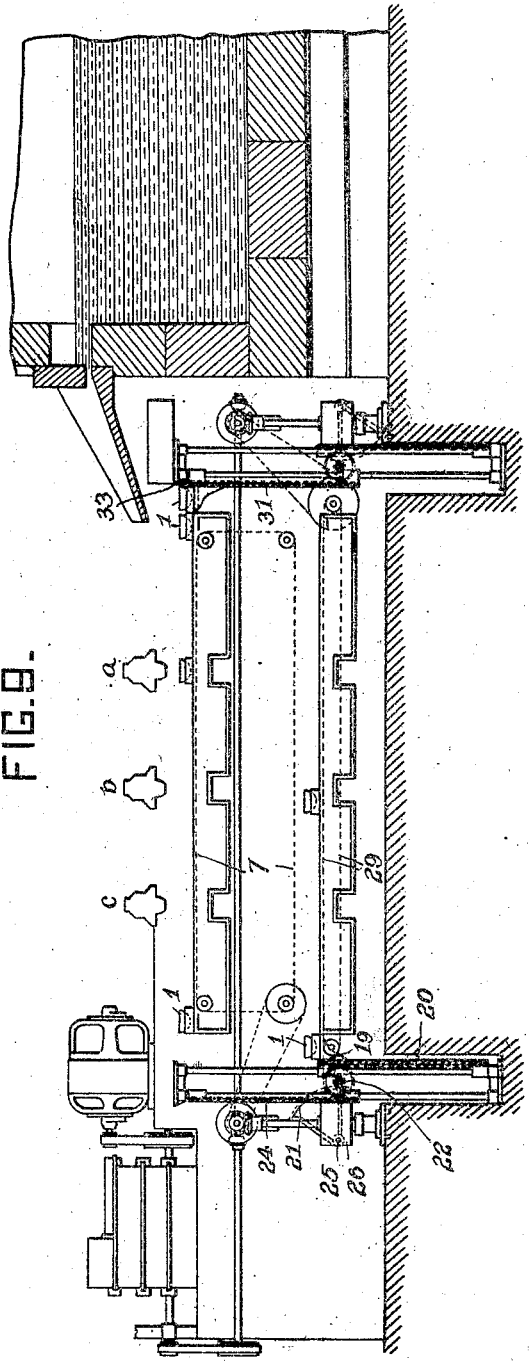
WITNESSES:
INVENTOR

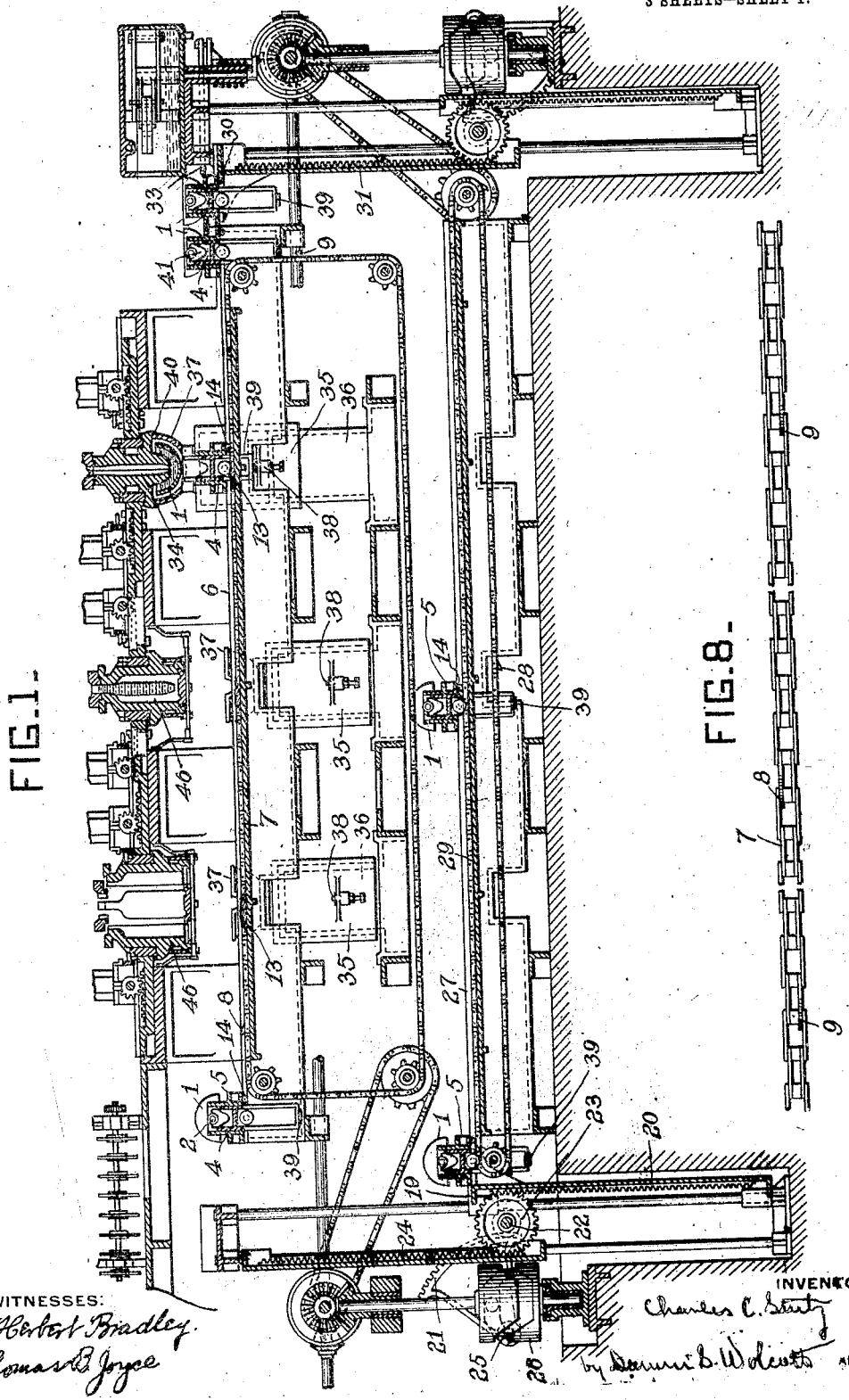

UNITED STATES PATENT OFFICE.

CHARLES C. STUTZ, OF NORWOOD, OHIO.

MANUFACTURE OF GLASS ARTICLES.

1,037,365.  Specification of Letters Patent.  Patented Sept. 3, 1912.

Application filed March 8, 1912. Serial No. 682,375.

*To all whom it may concern:*

Be it known that I, CHARLES C. STUTZ, residing at Norwood, in the county of Hamilton and State of Ohio, a citizen of the United States, have invented or discovered certain new and useful Improvements in Manufacture of Glass Articles, of which improvements the following is a specification.

The invention described herein relates to certain improvements in means for the transfer of glass from a furnace to a series of relatively stationary molds.

The invention has for its object the charging of a series of receptacles in succession by a stream flowing constantly from a furnace or other source of supply, moving the receptacles in succession to a series of suitably arranged molds and charging the latter in succession.

The invention is hereinafter more fully described and claimed.

In the accompanying drawings forming a part of this specification, Figure 1 is a sectional elevation of my improved apparatus; Fig. 2 is a transverse section on a plane indicated by the line II—II, Fig. 1; Fig. 3 is a top plan view of a portion of the mold operating mechanism showing two adjacent mold sections and the mechanism for shifting them to and from their companion mold sections, which are not shown; Figs. 4 and 5 are plan and sectional elevations respectively showing the ladle slide, carriage and the guides therefor; Figs. 6 and 7 are details showing a form of mechanism for turning the ladle and locking it in its normal and inverted position; Fig. 8 is a plan view of a portion of endless chain showing relative positions of hooks thereon; and Fig. 9 is a diagrammatic view showing the arrangement of the transfer and shaping mechanism relative to the furnace from which the receptacles are charged.

The ladles 1 are provided with shafts 2 which are rotatably mounted in bearing 3 on the vertically movable slides 4. These slides are mounted in guides on the carriages 5, which during the charging of the ladles and their movements to the molds and beyond, are supported by guides 6, extending from a point adjacent to but below the spout extending from the furnace or other source of supply. The carriages are moved along the guides by any suitable means, as the constantly operating endless chains 7 provided with two series of hooks 8 and 9, one series for moving the carriages and ladles to operative position relative to the molds, and the other series for moving the carriages from such position to a point where their return to ladle charging position will begin. The two series hooks are out of line transversely of the chain as shown in Figs. 5 and 9, and those of the series for moving the ladle from mold charging position are placed a distance from the hooks of the other series sufficient to permit the raising and lowering of the slide and the flow of glass into the mold before they engage and shift the carriage. The hooks 8 engage rollers 10 mounted on the vertically movable slides, and as the ladles approach position under the molds, rollers 12 mounted on the vertically movable slides, pass onto cam projections 13 on the guides 6 thereby raising the slides and the rollers 10 a sufficient distance to permit the hooks to pass under the latter. One lifting cam 13 is employed for each mold of the series, but as shown in Fig. 5, the several cams are out of line transversely of the guides 6, and the position of the rollers 12 on the vertical slides are correspondingly adjusted so that the slides will be raised only when the ladles approach the mold to be charged therefrom.

As soon as a ladle has stopped in proper relation to a mold, it is raised, glass is forced therefrom, and again lowered, as will be hereinafter described. After these operations have been performed, a hook 9 engages a pin 14 on the carriage 5, which is then shifted to the end of the guides 6, the hook passing down away from the pin 14. As a carriage approaches the end of the guides, provision is made for turning the ladle to discharge the remainder of the glass therein. A convenient means for that purpose consists of a toothed wheel 15 secured on the ladle shaft 2 and a series of pins 16 on one of the guides 6, as shown in Fig. 6. A similar series of pins are provided at the end of guides along which the carriage moves as it is returned to ladle charging position to return the ladle to receiving position. In order to lock the ladle in normal and inverted positions, a disk 17 having oppositely arranged notches in its edge, is secured on the ladle shaft, and a spring actuated pawl 18 is mounted on the slides to engage the notches.

A carriage with its inverted ladle remain on the guides at or adjacent to the ends of the latter until another carriage is moved to the same position, thereby pushing the first carriage onto arms 19 in a vertically movable slide 20. This slide may be moved up and down by any suitable means, as for example by a toothed segment 21 engaging a pinion on the shaft 22 on which is secured a pinion engaging a series of teeth 23 on the slide, and by preference this pinion engages a similar series of teeth on the counter balance 24. The segment is secured on a shaft 25 provided with a rocker arm having a pin projecting into a cam groove on the drum 26 which is driven in any suitable manner.

After a carriage has been moved onto the arms of the slide 20 the latter is lowered until the arms are in alinement with guides 27 similar to the guides 6. While supported by the slide in its lowered position, one of the pins on the slide or carriage is engaged by a hook 28 on the constantly operating endless chain 29, and moved along the guides 27 and onto arms 30 on the elevator 31, which is raised and lowered by mechanism similar to that employed in shifting the slide 20. While the carriage is moving along the guide 27, the ladle is cooled and cleansed by jets of fluid from the perforated pipes 32 as shown in Fig. 2. The slide is now raised bringing its arms 30 into alinement with the guides 6, onto which the carriage is pushed by a rod 33, which is reciprocated by any suitable means, preferably that shown and described in application Serial No. 676,465 filed February 8, 1912. As a carriage is pushed onto the guides 6, another carriage having its ladle in position under the stream of glass is shifted along the guides, and this second carriage placed in position where its ladle will intercept the stream of glass.

As described and shown in the application referred to the stream of glass may be severed as one ladle is substituted for the other, or the strand of glass extending from the charged ladle to the next may be sheared, or the connecting strand may be broken by the movement of the charged ladle toward the molds by the endless chain 7. The movement of the carriage from charging position brings the pin or roller 10 on the vertical slide 5 into the path of movemnt of the hooks 8, by one of which the carriage will be moved until the ladle reaches the proper position under one of the molds, when the carriage will be released from the hook. The vertically movable slide 4 carrying the ladle is now raised by any suitable means until the open lower end of the mold 34 is immersed a suitable distance in the glass. While not limiting the invention in this respect, it is preferred to employ an inverted movable fluid pressure cylinder 35 and a stationary piston 36 for this purpose. When employing pressure above that of the atmospheric for causing glass to flow from the ladle into the mold, as set forth in Letters Patent No. 1,007,156 dated October 31, 1911, a ladle inclosing basin 37 is secured to the cylinder 35 as shown in Fig. 2. In order to avoid lateral strains, when lifting the ladle and slide 4, the cylinder 35 is provided with an arm 38 adapted to engage a leg 39 on the slide. The basin inclosing the ladle is raised until its edge will form a tight joint with a plate 40 arranged above the lower open end of the mold. In order to close the notch formed in the edge of the basin for the reception of the ladle shaft 2, a block 41 adapted to close the notch as against any material escape of pressure is secured on the ladle shaft.

After the glass has been forced into the mold 34, the slide 4, basin and ladle are lowered, and as soon as the edge of the basin passes below the lower end of the mold, the strand of glass connecting the portions in the ladle and mold is severed by a blade 42, which is preferably arranged and operated as described and shown in Letters Patent No. 1,007,252, dated October 31, 1911, although other suitable means may be employed for that purpose.

The blank molds 34 into which the glass is charged and by which the initial form or shape is imparted to the glass, are arranged in tandem in the line of movement of the ladles from charging position, as shown in Figs. 1 and 9. These blank molds and the blow mold sections which are substituted for the former for the completion of the article, are preferably mounted and operated as described and shown in Letters Patent heretofore referred to, except that it is preferred that the molds should be in the same horizontal plane and not in different horizontal planes, as is desirable when employing the form of glass transfer mechanism of said patented machine. It is preferred as stated, to employ the means shown in the patent for opening and closing the blank and blow molds said means consisting of oscillating pinions 43 engaging racks 44 connected to the intermediate sections of rails 45, in which the blank molds 34 and blow molds 46 are movably mounted. The arrangement of all the blank molds in or approximately in the same horizontal plane, as stated, will cause the rack bars of one set of shaping mechanisms to interfere with those of the adjacent, unless said sets were spaced an undesirable distance apart. This objectionable feature can be overcome by forking one of the rack bars so that the rack bar of the adjacent set may pass in between the prongs of the forked bar, as clearly shown in Fig. 3.

It will be understood that while other forms of mechanism may be employed for substituting the blow molds for the blank molds and for completing the article, it is preferred to employ the constructions and combinations described and claimed in the Letters Patent referred to in connection with my improved glass transfer mechanism.

In the operation of my improved mechanism as soon as a ladle is charged it is moved and another ladle is placed to receive the glass constantly flowing from the furnace. A ladle as soon as charged, or as soon as the glass has cooled down to proper consistence is shifted by the described mechanism until in vertical alinement with one of the molds, as $a$ in Fig. 9. The ladle carriage is then released from the chain by a cam 13, the ladle raised and discharged into the mold. By the time these operations are completed, another ladle has been charged and ready to be moved along the guides 6, or may have been charged and be on its way toward its mold as $b$. Before this second mold has reached mold $a$, carriage carrying the ladle discharged into the latter is caught by a hook 9 and moved along out of the way of the oncoming carriage and ladle, which will be disconnected from the chain, as soon as proper position relative to its mold as $b$ is reached.

It will be understood that the movement of the glass from the ladle to the mold is due to differences of pressure on the glass in the ladle and the pressure in the mold, and that such differences may be attained in the practice of my invention, by any suitable means known in the art.

I claim herein as my invention:

1. In a mechanism for shaping glass articles, the combination of a plurality of stationary molds, a plurality of receptacles, means for shifting said receptacles in succession from a point of supply to operative relation to the successive molds.

2. In a mechanism for shaping glass articles, the combination of a plurality of molds arranged in tandem, a plurality of receptacles, means for shifting the receptacles in succession from a point of supply to operative relation to the successive molds.

3. In a mechanism for shaping glass articles, the combination of a plurality of molds arranged in tandem, a plurality of receptacles, constantly operating means for engaging said receptacles and shifting them from a point of supply, means for releasing the receptacles when in position relative to the molds from engagement with the moving means, and means for moving them from the molds after the latter are charged.

4. In a mechanism for shaping glass articles, the combination of a plurality of molds arranged in tandem, a plurality of receptacles, constantly operating means for engaging said receptacles and shifting them from a point of supply, means for releasing the receptacles when in position relative to the molds from engagement with the removing means, means for moving the receptacles to position for flow of glass into the molds, and means for moving them from the molds after the latter are charged.

5. In a mechanism for shaping glass articles, the combination of a series of molds arranged in tandem, a plurality of receptacles, an endless constantly operating chain extending from a point of supply along the line of molds and provided with hooks for engagement with the receptacles, means adjacent to each mold for freeing the respective receptacles from engagement with the chain, and hooks in the chains for engaging the receptacles and shifting them away from the molds.

In testimony whereof, I have hereunto set my hand.

CHARLES C. STUTZ.

Witnesses:
ALICE A. TRILL,
THOMAS B. JOYCE.